US008093321B2

(12) United States Patent
Keller et al.

(10) Patent No.: US 8,093,321 B2
(45) Date of Patent: Jan. 10, 2012

(54) METHOD FOR COATING SURFACES AND AQUEOUS FORMULATIONS SUITED THEREFOR

(75) Inventors: Claudia Keller, Oberhausen-Rheinhausen (DE); Bernd Düttra, Hassloch (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 12/524,795

(22) PCT Filed: Jan. 29, 2008

(86) PCT No.: PCT/EP2008/051029
§ 371 (c)(1),
(2), (4) Date: Jul. 28, 2009

(87) PCT Pub. No.: WO2008/092853
PCT Pub. Date: Aug. 7, 2008

(65) Prior Publication Data
US 2010/0063188 A1   Mar. 11, 2010

(30) Foreign Application Priority Data
Feb. 1, 2007   (EP) .................................. 07101594

(51) Int. Cl.
*C08K 5/521*   (2006.01)
*C08K 5/101*   (2006.01)
(52) U.S. Cl. ..................... 524/140; 524/319; 524/522
(58) Field of Classification Search .................. 524/522, 524/140, 319
See application file for complete search history.

(56) References Cited

U.S. PATENT DOCUMENTS

| 4,693,909 A * | 9/1987 | Ziegler et al. ................. 427/156 |
| 4,996,259 A | 2/1991 | Koehler et al. |
| 5,028,265 A * | 7/1991 | Schmidt-Thuemmes et al. ............................ 106/271 |
| 5,034,275 A * | 7/1991 | Pearson et al. ................ 428/336 |
| 2006/0124554 A1 | 6/2006 | Fechtenkotter et al. |
| 2008/0200604 A1 * | 8/2008 | Fechtenkotter et al. ...... 524/556 |

FOREIGN PATENT DOCUMENTS

| EP | 0359045 A2 | 3/1990 |
| EP | 0410262 A2 | 1/1991 |
| EP | 0813550 B1 | 11/1999 |
| WO | WO-2004108601 A1 | 12/2004 |
| WO | WO-2007/009909 | 1/2007 |

OTHER PUBLICATIONS

U.S. Appl. No. 11/995,982, filed Jan. 17, 2008, Fechtenkotter et al.

* cited by examiner

*Primary Examiner* — Peter Szekely
(74) *Attorney, Agent, or Firm* — Connolly Bove Lodge & Hutz LLP

(57) ABSTRACT

A method for coating surfaces by treatment with a substantially paraffin-free aqueous formulation, comprising
(A) at least one copolymer having a melt flow rate (MFR) in the range from 1 to 50 g/10 min, which comprises, incorporated in the form of polymerized units,
(a) from 65 to 84.5% by weight of ethylene,
(b) from 25.5 to 35% by weight of at least one ethylenically unsaturated carboxylic acid,
and which is at least partly neutralized with alkali metal,
(B) at least one nonionic or anionic surfactant,
(C) at least one antifoam,
(D) if appropriate, at least one organic amine,
(E) if appropriate, at least one organic solvent.

14 Claims, No Drawings

METHOD FOR COATING SURFACES AND AQUEOUS FORMULATIONS SUITED THEREFOR

CROSS-REFERENCE TO RELATED APPLICATIONS

This application is a national stage application (under 35 U.S.C. §371) of PCT/EP2008/051029, filed Jan. 29, 2008, which claims benefit of European application 07101594.5, filed Feb. 1, 2007.

BACKGROUND OF THE INVENTION

The present invention relates to a method for coating surfaces by treatment with at least one substantially paraffin-free aqueous formulation, comprising
(A) at least one copolymer having a melt flow rate (MFR) in the range from 1 to 50 g/10 min, which comprises, incorporated in the form of polymerized units,
   (a) from 65 to 74.5% by weight of ethylene,
   (b) from 25.5 to 35% by weight of at least one ethylenically unsaturated carboxylic acid,
   and which is at least partly neutralized with alkali metal,
(B) at least one nonionic or anionic surfactant,
(C) at least one antifoam,
(D) if appropriate, at least one organic amine,
(E) if appropriate, at least one organic solvent.

The present invention furthermore relates to surfaces coated by the method according to the invention. The present invention furthermore relates to aqueous formulations which are particularly suitable for carrying out the method according to the invention.

Surfaces, for example metal surfaces, are coated in numerous cases in order to protect them from environmental influences. Finishes may be mentioned by way of example. Such coatings are also referred to as permanent coatings since they are intended to display their protection for a relatively long time, for example at least one year.

On the other hand, however, it is also desired to provide surfaces by coating with shorter protection, for example from dirt and in particular from fingerprints. Such protection may be effective for a few days or weeks or even less and need not be complete, and may also result in retardation of soiling. However, the dirt, in particular the fingerprints, can then be removed by simply wiping off. Such a coating is also referred to as a temporary coating. Thereafter, the surfaces can be coated again.

In the choice of the coating material, paraffins are generally recommended in association with metal surfaces. In order to be able to apply paraffins to surfaces, in particular metal surfaces, it is desired to formulate them in water and then to apply them. Thus, one or more surface-active substances (emulsifiers, surfactants) are required in order to formulate the paraffin. For example, ethylene/acrylic acid copolymers are described in the literature as suitable surface-active substances.

However, paraffins have disadvantages when they are used for the temporary coating of surfaces. The effectiveness of paraffin-containing coatings lasts as a rule for a day or less and is therefore too short for many applications. Furthermore, paraffin-containing coatings frequently tend to smear and are therefore unacceptable for coating where cleanliness is important, for example metal surfaces in kitchens, in particular kitchen fittings and industrial dishwashers.

Many other coatings which, compared with coatings with paraffin, have the advantage of greater stability are difficult to remove, for example by strongly alkaline cleaning solutions, in the case of soiling.

BRIEF SUMMARY OF THE INVENTION

The invention is directed to a substantially paraffin-free aqueous formulation which comprises
(A) at least one copolymer having a melt flow rate (MFR) in the range from 1 to 50 g/10 min, which comprises, incorporated in the form of polymerized units,
   (a) from 65 to 74.5% by weight of ethylene,
   (b) from 25.5 to 35% by weight of at least one ethylenically unsaturated carboxylic acid,
   and which is at least partly neutralized with alkali metal,
(B) at least one nonionic or anionic surfactant,
(C) at least one antifoam,
(D) optionally, at least one organic amine, and optionally, at least one organic solvent.

The invention further relates to a method of coating a surface using the inventive formulation.

It was therefore the object to provide a method for coating surfaces, by means of which good temporary protection from soiling and in particular from fingerprints is ensured and by means of which furthermore it is ensured that the coating can be easily removed. Furthermore, it was the object to provide temporarily coated surfaces. Furthermore, it was the object to provide formulations with which the method according to the invention can be readily carried out, and it was the object to provide a process for the preparation of such formulations.

Accordingly, the method defined at the outset was found.

DETAILED DESCRIPTION OF THE INVENTION

The method according to the invention starts from surfaces which may comprise any desired materials. Preferably, they are glossy surfaces (surfaces having a glossy appearance). On glossy surfaces, dirt and also fingerprints are as a rule clearly evident. Examples of glossy surfaces are surfaces of smooth plastic, in particular of thermosetting plastics.

Surfaces are preferably those comprising metal, in particular steel, such as, for example, stainless steel. Metal surfaces in the context of the present invention may be painted or preferably unpainted. Unpainted metal surfaces can, for example, be brushed.

Surfaces and in particular metal surfaces may belong, for example, to building parts, in particular window frames and doors, and door handles and door fittings may be mentioned in particular, Surfaces and in particular metal surfaces may belong to apparatuses, for example refrigerators, chest freezers, cookers and washing machines. Surfaces and in particular metal surfaces may also be fittings, for example in kitchens, in particular industrial kitchens, bathrooms or cloakrooms.

In one embodiment of the present invention, surfaces and in particular metal surfaces can be cleaned by methods known per se for the actual coating according to the invention.

For carrying out the method according to the invention, surfaces are coated with a substantially paraffin-free aqueous formulation which comprises:
(A) at least one copolymer having a melt flow rate (MFR) in the range from 1 to 50 g/10 min, which comprises, incorporated in the form of polymerized units,
   (a) from 65 to 74.5% by weight of ethylene,
   (b) from 25.5 to 35% by weight of at least one ethylenically unsaturated carboxylic acid,
   and which is at least partly neutralized with alkali metal, (B) at least one nonionic or anionic surfactant,
(C) at least one antifoam,
(D) if appropriate, at least one organic amine,
(E) if appropriate, at least one organic solvent.

Paraffin-free is understood as meaning that aqueous formulations used in the method according to the invention, which is also referred to as coating method according to the invention in the context of the present invention, comprise not more than 0.5% by weight of paraffin, preferably not more than 0.1% by weight of paraffin, based on the solids content of the relevant aqueous formulation, i.e. the sum of the constituents (A), (B), if appropriate (C) and if appropriate (D). Paraffins in the context of the present invention also comprise white oil.

Aqueous dispersions used in the coating method according to the invention are preferably furthermore substantially silicone oil-free. Silicone oil-free is understood as meaning that aqueous formulations used in the coating method according to the invention comprise not more than 0.5% by weight of silicone oil, preferably not more than 0.1% by weight of silicone oil, based on the solids content of the relevant aqueous formulation, i.e. the sum of the constituents (A), (B), if appropriate (C) and if appropriate (D).

Aqueous formulations used in the coating method according to the invention are substantially paraffin-free and comprise at least one copolymer, also referred to as copolymer (A) for short, having a melt flow rate (MFR) in the range from 1 to 50 g/10 min, preferably from 5 to 20 g/10 min, particularly preferably from 7 to 15 g/10 min, measured at 160° C. and a load of 325 g according to EN ISO 1133, which comprises, incorporated in the form of polymerized units,
(a) from 65 to 74.5% by weight, preferably from 70 to 73.5% by weight, of ethylene,
(b) from 25.5 to 35% by weight, preferably from 26.5 to 30% by weight, of at least one ethylenically unsaturated carboxylic acid, which is at least partly neutralized with alkali metal, in particular with potassium or sodium,
data in % by weight being based on the total copolymer (A).

At least partly neutralized is understood as meaning that at least 33 mol % of all carboxyl groups of copolymer (A) have been neutralized with alkali metal, i.e. are present as a salt.

In one embodiment of the present invention, in the range of from 50 to 99 mol % of all carboxyl groups of copolymer (A) have been neutralized with alkali metal. In a special embodiment of the present invention, all carboxyl groups of copolymer (A) have been neutralized with alkali metal.

The ethylenically unsaturated carboxylic acid (b) chosen is preferably at least one carboxylic acid of the general formula I

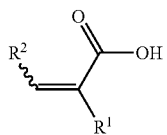

in which the variables are defined as follows:
$R^1$ and $R^2$ are identical or different.
$R^1$ is selected from hydrogen and straight-chain and branched $C_1$-$C_{10}$-alkyl, such as, for example, methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, n-octyl, 2-ethylhexyl, n-nonyl, n-decyl; particularly preferably $C_1$-$C_4$-alkyl, such as methyl, ethyl, n-propyl, isopropyl, n-butyl, isobutyl, sec-butyl and tert-butyl, in particular methyl;
$R^2$ is selected from straight-chain and branched $C_1$-$C_{10}$-alkyl, such as, for example, methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, n-octyl, 2-ethylhexyl, n-nonyl, n-decyl; particularly preferably $C_1$-$C_4$-alkyl, such as methyl, ethyl, n-propyl, isopropyl, n-butyl, isobutyl, sec-butyl and tert-butyl, in particular methyl;
and very particularly preferably hydrogen.

In one embodiment of the present invention, $R^1$ is hydrogen or methyl. $R^1$ is very particularly preferably methyl.

In one embodiment of the present invention, $R^1$ is hydrogen or methyl and $R^2$ is hydrogen.

Methacrylic acid is very particularly preferably used as the ethylenically unsaturated carboxylic acid of the general formula I.

If it is desired to use a copolymer (A) which comprises a plurality of ethylenically unsaturated carboxylic acids (b) incorporated in the form of polymerized units, it is possible to use, for example, two different ethylenically unsaturated carboxylic acids of the general formula I, such as, for example, acrylic acid and methacrylic acid. The percentages are then based on the total proportion of ethylenically unsaturated carboxylic acids (b).

In one embodiment, copolymer (A) may comprise one or more further comonomers (c) incorporated in the form of polymerized units, for example vinyl acetate, vinyl propionate, styrene or one or more ethylenically unsaturated $C_1$-$C_{10}$-alkyl $C_3$-$C_{10}$-carboxylates, in particular methyl acrylate, methyl methacrylate, n-butyl acrylate, ethyl acrylate, and ethyl methacrylate, and furthermore isobutene and $C_{16}$-$C_{30}$-α-olefin.

If copolymer (A) comprises one or more comonomers (c) incorporated in the form of polymerized units, the proportion of comonomers (c) may be from 0.1 to 20% by weight, based on the sum of ethylenically unsaturated carboxylic acid (b) and ethylene (a) incorporated in the form of polymerized units.

In another embodiment of the present invention, copolymer (A) comprises no further comonomers incorporated in the form of polymerized units, apart from ethylenically unsaturated carboxylic acid (b) and ethylene (a).

In one embodiment of the present invention, the acid number of copolymer (A) is from 100 to 300 mg KOH/g, preferably from 115 to 230 mg KOH/g, determined according to DIN 53402.

In one embodiment of the present invention, copolymer (A) has a kinematic melt viscosity v of at least 45 000 mm²/s, preferably of at least 50 000 mm²/s, determined at 120° C.

In one embodiment of the present invention, the melting range of copolymer (A) is in the range from 60 to 110° C., preferably in the range from 65 to 90° C., determined by DSC according to DIN 51007.

In one embodiment of the present invention, copolymer (A) may have an average molecular weight $M_n$ in the range from 1000 to 20 000 g/mol.

Copolymer (A) can advantageously be prepared by free radical copolymerization under high pressure conditions, for example in stirred, high-pressure autoclaves or in high-pressure tubular reactors. The preparation in stirred high-pressure autoclaves is preferred. Stirred high-pressure autoclaves are known per se and a description is to be found in *Ullmann's Encyclopedia of Industrial Chemistry*, 5th edition, keywords: Waxes, vol. A 28, page 146 et seq., Verlag Chemie Weinheim, Basle, Cambridge, N.Y., Tokyo, 1996. In them, the length/diameter ratio is predominantly in the ranges from 5:1 to 30:1 preferably from 10:1 to 20:1. The high-pressure tubular reactors which can likewise be used are likewise described in *Ullmann's Encyclopedia of Industrial Chemistry*, 5th edition, keywords: Waxes, vol. A 28, page 146 et seq., Verlag Chemie Weinheim, Basle, Cambridge, N.Y., Tokyo, 1996.

Suitable pressure conditions for the polymerization are from 500 to 4000 bar, preferably from 1500 to 2500 bar. Conditions of this type are also referred to below as high pressure. The reaction temperatures are in the range from 170 to 300° C., preferably in the range from 195 to 280° C.

The polymerization can advantageously be carried out in the presence of a regulator. The regulator used is, for example, hydrogen or at least one aliphatic aldehyde or at least one aliphatic ketone of the general formula II

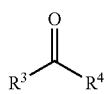

or a mixture thereof.

The radicals $R^3$ and $R^4$ are identical or different and are selected from
hydrogen;
$C_1$-$C_6$-alkyl, such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, particularly preferably $C_1$-$C_4$-alkyl, such as methyl, ethyl, n-propyl, isopropyl, n-butyl, isobutyl, sec-butyl and tert-butyl;
$C_3$-$C_{12}$-cycloalkyl such as cyclopropyl, cyclobutyl, cyclopentyl, cyclohexyl, cycloheptyl, cyclooctyl, cyclononyl, cyclodecyl, cycloundecyl and cyclododecyl; cyclopentyl, cyclohexyl and cycloheptyl are preferred.

In a particular embodiment, the radicals $R^3$ and $R^4$ are covalently linked to one another with formation of a 4- to 13-membered ring. Thus, $R^3$ and $R^4$ together may be, for example: —($CH_2$)$_4$—, —($CH_2$)$_5$—, —($CH_2$)$_6$—, —($CH_2$)$_7$—, —CH($CH_3$)—$CH_2$—$CH_2$—CH($CH_3$)— or —CH($CH_3$)—$CH_2$—$CH_2$—$CH_2$—CH($CH_3$)—.

Examples of suitable regulators are furthermore alkylaromatic compounds, for example toluene, ethylbenzene or one or more isomers of xylene. Examples of very suitable regulators are furthermore paraffins, such as, for example, isododecane (2,2,4,6,6-pentamethylheptane) or isooctane.

The customary free radical initiators, such as, for example, organic peroxides, oxygen or azo compounds, can be used as initiators for the free radical polymerization. Mixtures of a plurality of free radical initiators are also suitable.

Suitable peroxides, selected from commercially available substances, are didecanoyl peroxide, 2,5-dimethyl-2,5-di(2-ethylhexanoylperoxy)hexane, tert-amyl peroxy-2-ethylhexanoate, dibenzoyl peroxide, tert-butyl peroxy-2-ethylhexanoate, tert-butyl peroxydiethylacetate, tert-butyl peroxydiethylisobutyrate, 1,4-di(tert-butylperoxycarbonyl)cyclohexane as an isomer mixture, tert-butyl perisononanoate, 1,1-di(tert-butylperoxy)-3,3,5-trimethylcyclohexane, 1,1-di(tert-butylperoxy)cyclohexane, methyl isobutyl ketone peroxide, tert-butyl peroxyisopropyl carbonate, 2,2-di(tert-butylperoxy)butane or tert-butyl peroxyacetate; tert-butyl peroxybenzoate, di-tert-amyl peroxide, dicumyl peroxide, the isomeric di(tert-butylperoxyisopropyl)benzenes, 2,5-dimethyl-2,5-di-tert-butylperoxyhexane, tert-butyl cumyl peroxide, 2,5-dimethyl-2,5-di(tert-butylperoxy)hex-3-yne, di-tert-butyl peroxide, 1,3-diisopropylbenzene monohydroperoxide, cumyl hydroperoxide or tert-butyl hydroperoxide; or
dimeric or trimeric ketone peroxides, as described in EP-A 0 813 550.

Particularly suitable peroxides are di-tert-butyl peroxide, tert-butyl peroxypivalate, tort-butyl peroxyisononanoate or dibenzoyl peroxide or mixtures thereof. Azobisisobutyronitrile ("AIBN") may be mentioned by way of example as an azo compound. Free radical initiators are metered in amounts customary for polymerizations.

Numerous commercially available organic peroxides are mixed with so-called stabilizers before they are sold, in order to make them easier to handle. Suitable stabilizers are, for example, white oil or hydrocarbons, such as, in particular isododecane. Under the conditions of the high-pressure polymerization, such stabilizers can have a molecular weight-regulating effect. In the context of the present invention, the use of molecular weight regulators is to be understood as meaning the additional use of further molecular weight regulators over and above the use of the stabilizers.

The ratio of the comonomers (a), (b) and, if appropriate, (c) during the metering usually does not correspond exactly to the ratio of the units in copolymer (A) because ethylenically unsaturated carboxylic acids are generally more easily incorporated into copolymer (A) than ethylene.

The comonomers (a), (b) and, if appropriate, (c) are usually metered together or separately.

The comonomers (a), (b) and, if appropriate, (c) can be compressed in a compressor to the polymerization pressure. In another embodiment of the method according to the invention, the comonomers are first brought to an elevated pressure of, for example, from 150 to 400 bar, preferably from 200 to 300 bar and in particular 260 bar with the aid of a pump and then to the actual polymerization pressure by means of a compressor.

The copolymerization of the comonomers (a), (b) and, if appropriate, (c) can optionally be carried out in the absence or in the presence of solvents, mineral oils, white oil and other solvents which are present in the reactor during the polymerization and were used for stabilizing the free radical initiator or initiators not being considered as solvents in the context of the present invention. Suitable solvents are, for example, toluene, isododecane and the isomers of xylene.

In order to prepare copolymer (A) in at least partly neutralized form, it can be mixed with a preferably aqueous solution of one or more basic alkali metal compounds, preferably of one or more hydroxides and/or carbonates and/or bicarbonates of alkali metals, in particular with potassium hydroxide or sodium hydroxide.

In one embodiment of the present invention, copolymer (A) is mixed with more hydroxide and/or carbonate and/or bicarbonate of alkali metal than is required for neutralizing the carboxyl groups.

Aqueous formulation used in the coating method according to the invention furthermore comprises
(B) at least one nonionic or anionic surfactant.

Nonionic surfactants are preferably selected from di- to decaalkoxylated, preferably tri- to heptaalkoxylated, oxo and fatty alcohols and from fluorinated surfactants.

Di- to decaalkoxylated, preferably tri- to heptaalkoxylated, oxo or fatty alcohols are understood as meaning those compounds in which from two to ten, preferably from three to seven, moles of alkylene oxide, preferably $C_2$-$C_4$-alkylene oxide, such as butylene oxide, preferably propylene oxide and particularly preferably ethylene oxide, have been reacted with one mole of oxo or fatty alcohol.

Preferred oxo alcohols are $C_{11}$-$C_{21}$-oxo alcohols, particularly preferably $C_{13}$-$C_{15}$-oxo alcohols. Preferred fatty alcohols are straight-chain, preferably saturated or at most monounsaturated primary $C_{12}$-$C_{40}$-alcohols.

Fluorosurfactants are to be understood as meaning in particular acidic phosphoric acid esters of non-fluorinated or preferably fluorinated alcohols and mixed acidic phosphoric acid esters of fluorinated and non-fluorinated alcohols, and salts of the abovementioned acidic phosphoric acid esters. n-$C_4$-$C_{20}$-alkanols which have at least one fluorine atom, preferably at least 5 fluorine atoms, per molecule may be mentioned in particular as fluorinated alcohols. Fluorine-free n-$C_4$-$C_{20}$-alkanols may be mentioned in particular as non-fluorinated alcohols.

Acidic phosphoric acid esters of the general formula III

$$(R^F\text{—}CH_2CH_2O)_xP(O)(ONH_4)_y \quad\quad\quad III$$

in which the variables are defined as follows:
$R^F$ is selected from $F(CF_2CF_2)_z$
z is an integer in the range from 1 to 9, preferably up to 7,
x is 1 or 2,
y is 2 or 1,
and x+y=3,
and acidic phosphoric acid esters of the general formula IV

$$(R^5O)_xP(O)(ONH_4)_y \quad\quad\quad IV$$

where $R^5$ is selected from n-$C_4$-$C_{20}$-alkyl, preferably up to $C_{1-8}$-alkyl, for example n-butyl, n-pentyl, n-hexyl, n-octyl, n-nonyl, n-decyl, n-undecyl, n-dodecyl, n-tetradecyl, n-hexadecyl, n-octadecyl and n-eicosyl, in particular n-decyl, n-undecyl, n-dodecyl, n-tetradecyl, n-hexadecyl, n-octadecyl and the other variables are as defined above, are very particularly preferred.

Aqueous formulation used in the coating method according to the invention furthermore comprises
(C) at least one antifoam which, in the context of the present invention, can also be referred to as foam inhibitor or antifoam (C).

Suitable antifoams (C) are selected in particular from polyalkoxylated glycerol, for example glycerol having a degree of ethoxylation from 2 to 20, polypropylene oxide, for example having from 10 to 50 polypropylene oxide units per molecule, and preferably tri-$C_1$-$C_6$-alkyl phosphates. In tri-$C_1$-$C_6$-alkyl phosphates, the $C_1$-$C_6$-alkyl radicals may be different or preferably identical, and they may be straight-chain, for example methyl, ethyl, n-propyl, n-butyl, n-pentyl or n-hexyl, or preferably branched, in particular isopropyl, isobutyl, sec-butyl, isopentyl, sec-pentyl, 3-pentyl, isohexyl, sec-hexyl, isoamyl, very particular preferably isobutyl.

A very particularly preferred antifoam (C) is phosphoric acid triisobutyl ester, also referred to as triisobutyl phosphate.

In one embodiment of the present invention, the aqueous formulation used in the coating method according to the invention may comprise at least one organic amine (D), preferably an ethanolamine, such as, for example, monoethanolamine, N,N-diethanolamine, N,N,N-triethanolamine or N-methyldiethanolamine.

In one embodiment of the present invention, the aqueous formulation used in the coating method according to the invention may comprise at least one organic solvent, (E), preferably an organic solvent which is miscible with water. Particularly preferred are $C_1$-$C_4$-alcohols, in particular ethanol and isopropanol, and furthermore isobutanol, n-butanol, butyldiglycol (diethylene glycol mono-n-butyl ether) and methanol.

In one embodiment of the present invention, substantially paraffin-free aqueous formulation used in the coating method according to the invention comprises in the range from 1 to 40% by weight, preferably from 5 to 30% by weight, of copolymer (A),
in the range from 0.0001 to 5% by weight, preferably from 0.001 to 3% by weight, of anionic or nonionic surfactant (B),
in the range from 0.01 to 5% by weight, preferably from 0.1 to 3% by weight, of antifoam (C),
in the range from zero to 5% by weight, preferably from 0.1 to 2% by weight, of organic amine (D),
in the range from zero to 60% by weight, preferably from 0.1 to 20% by weight, of organic solvent (E),
the remainder preferably being water which may contain salt or is preferably distilled. Data in % by weight are based on the total aqueous formulation used in the coating method according to the invention.

The coating method according to the invention can be carried out, for example, by spraying the surface to be coated. An article having the surface to be coated can also be immersed in the aqueous formulation described above.

In one embodiment of the present invention, one or more aqueous formulations described above can be applied to the surface to be coated by treatment with textile, in particular with a moist cloth or a moist nonwoven.

Curing can be effected by thermal treatment, for example drying at from 30 to 100° C., or drying can be effected in the air.

The present invention furthermore relates to surfaces coated by the coating method according to the invention. Surfaces according to the invention show a substantially lower tendency to soiling than those surfaces which are coated with paraffin. On surfaces according to the invention, fingerprints are not so conspicuous as on surfaces which are coated with paraffin. In particular, it is observed that, when they are soiled or provided with fingerprints, surfaces according to the invention can be easily cleaned with a cloth, for example a nonwoven, dust cloth, kitchen cloth or paper tissue, or with wadding. Thereafter it can be coated again by the coating method according to the invention.

In many cases, it may be observed that surfaces which have been coated by the method according to the invention and provided with fingerprints can be cleaned with a dry cloth, for example nonwoven, dust cloth, kitchen cloth or paper tissue, or can be cleaned with wadding, without it being necessary to exert great pressure.

Surfaces coated by the method according to the invention preferably have a layer thickness in the range from 1 to 100 μm, preferably from 1.5 to 50 μm, after drying. In the case of surfaces which belong to easily movable articles, the layer thickness can be determined by weighing. The layer thickness can furthermore be determined optically, for example microscopically. It is also possible to calculate a layer thickness assuming quantitative deposition of copolymer (A) and emulsifier (B).

The present invention furthermore relates to substantially paraffin-free aqueous formulations comprising
(A) at least one copolymer having a melt flow rate (MFR) in the range from 1 to 50 g/10 min, preferably from 5 to 20 g/10 min, particularly preferably from 7 to 15 g/10 min, measured at 160° C. and a load of 325 g according to EN ISO 1133, which comprises, incorporated in the form of polymerized units,
(a) from 65 to 84.5% by weight, preferably from 70 to 73.5% by weight, of ethylene, (b) from 25.5 to 35% by weight, preferably from 26.5 to 30% by weight, of at least one ethylenically unsaturated carboxylic acid, in particular (meth)acrylic acid, and which is at least partly neutralized with alkali metal, in particular is neutralized with potassium or sodium, data in % by weight being based on the total copolymer (A), (B) at least one nonionic or anionic surfactant,
(C) at least one antifoam,
(D) if appropriate, at least one organic amine,
(E) if appropriate, at least one organic solvent.

In one embodiment of the present invention, nonionic surfactant (B) is selected from tri- to heptaalkoxylated oxo and fatty alcohols.

In one embodiment of the present invention, anionic surfactant is selected from fluorinated surfactants.

In one embodiment of the present invention, antifoam (C) is selected from polyalkoxylated glycerol, polypropylene oxide and tri-$C_1$-$C_6$-alkyl phosphates.

In one embodiment of the present invention, antifoam (C) is triisobutyl phosphate.

In one embodiment of the present invention, substantially paraffin-free aqueous formulation according to the invention comprises in the range from 1 to 40% by weight, preferably from 5 to 30% by weight, of copolymer (A),
in the range from 0.0001 to 5% by weight, preferably from 0.001 to 3% by weight, of anionic or nonionic surfactant (B),
in the range from 0.01 to 5% by weight, preferably from 0.1 to 3% by weight, of antifoam (C),
in the range from zero to 5% by weight, preferably from 0.1 to 2% by weight, of organic amine (D),
in the range from zero to 60% by weight, preferably from 0.1 to 20% by weight, of organic solvent (E),
the remainder preferably being water which may contain salt or is preferably distilled. Data in % by weight are based on the total aqueous formulation according to the invention.

Further details of copolymer (A), anionic or nonionic surfactants (B), antifoam (C), organic amines (D) and organic solvents (E) are described above.

In one embodiment of the present invention, aqueous formulations according to the invention have a pH in the range from 7.5 to 14, particularly preferably from 8 to 12 and very particularly preferably from 8.5 to 11.5.

In one embodiment of the present invention, aqueous formulations according to the invention have a solids content in the range from 1.0101 to 45% by weight, preferably from 3 to 35% by weight.

The present invention furthermore relates to a process for the preparation of aqueous formulations, also referred to below as preparation process according to the invention. In the preparation process according to the invention, (A) at least one copolymer having a melt flow rate (MFR) in the range from 1 to 50 g/10 min, which comprises, incorporated in the form of polymerized units,
  (a) from 65 to 74.5% by weight of ethylene,
  (b) from 25.5 to 35% by weight of at least one ethylenically unsaturated carboxylic acid,
  and which is at least partly neutralized with alkali metal,
(B) at least one nonionic or anionic surfactant,
(C) at least one antifoam,
(D) if appropriate, at least one organic amine,
(E) if appropriate, at least one organic solvent,
are mixed with one another in water.

Preferably, a procedure is adopted in which the preparation process according to the invention is carried out in two steps. In a first step, copolymer (A) and, if appropriate, a nonionic or anionic surfactant (B) are mixed with water. In the second step, antifoam (C) and—if no nonionic or anionic surfactant (B) was added in the first step also at least one nonionic or anionic surfactant (B) are added. Organic amine (D) and organic solvent (E) can, if the addition is required, be added at any point in the preparation process according to the invention.

It is preferable to carry out the first step of the preparation process according to the invention at a temperature which is above the melting point of copolymer (A).

In a special embodiment of the present invention, the preparation process according to the invention is carried out starting from one or more of the copolymers (A) described above. Copolymers (A) are placed in a vessel, for example a flask, an autoclave or a kettle, and the copolymer or copolymers (A), water and one or more basic alkali metal compounds and, if appropriate, further constituents, for example nonionic or anionic surfactant (B) or antifoam (C), are heated, the sequence of addition of water and addition of basic alkali metal compound and, if appropriate, further constituents being arbitrary. If the temperature for carrying out the preparation process according to the invention is to be above 100° C., it is advantageous to work under elevated pressure and to choose the vessel appropriately. The resulting emulsion is homogenized, for example by mechanical or pneumatic stirring or by shaking. Heating is advantageously effected to a temperature above the melting point of the copolymer or copolymers (A). Advantageously, heating is effected to a temperature which is at least 10° C., particularly advantageously to a temperature which is at least 30° C., above the melting point of the copolymer or copolymers (A).

If a plurality of different copolymers (A) is used, heating is effected to a temperature which is above the melting point of the copolymer (A) melting at the highest temperature. Where a plurality of different copolymers (A) is used, heating is advantageously effected to a temperature which is at least 10° C. above the melting point of the copolymer (A) melting at the highest temperature. Where a plurality of different copolymers (A) is used, heating is particularly advantageously effected to a temperature which is at least 30° C. above the melting point of the copolymer (A) melting at the highest temperature.

Thereafter, the aqueous formulation thus prepared is allowed to cool. Before, during or after the cooling, at least one nonionic or anionic surfactant (B) or antifoam (C) is added, if not yet implemented.

The aqueous formulations prepared by the preparation process according to the invention are distinguished by a good shelf-life and can be readily used in the above-described coating method according to the invention.

The invention is explained by working examples.

1. Preparation of Copolymer (A.1)

Ethylene and methacrylic acid were copolymerized in a high-pressure autoclave as described in the literature (M. Buback et al., Chem. Ing Tech. 1994, 66, 510). For this purpose, ethylene (12.0 kg/h) was fed continuously into the high-pressure autoclave under the reaction pressure of 1700 bar. Separately therefrom, 0.71 kg/h (0.72 l/h) of methacrylic acid was first compressed to an intermediate pressure of 260 bar and then fed continuously into the high-pressure autoclave with the aid of a further compressor under the reaction pressure of 1700 bar. Separately therefrom, 1.18 l/h of initiator solution, consisting of tert-butyl peroxypivalate (in isododecane, 0.07 mol/l), were fed continuously into the high-pressure autoclave under the reaction pressure of 1700 bar. Separately therefrom, the amount of regulator stated in table 1, consisting of propionaldehyde in isododecane (for concentration, cf. table 1), was first compressed to an intermediate pressure of 260 bar and then fed continuously into the high-pressure autoclave with the aid of a further compressor under the reaction pressure of 1700 bar. The maximum internal temperature of the high-pressure reactor was about 200° C. 2.3 kg/h of copolymer (A.1) were obtained, which corresponded to an ethylene conversion of 18%, with the analytical data shown below.

Ethylene content: 72.8% by weight, content of methacrylic acid 27.2% by weight, acid number: 170 mg KOH/g, melting point: 79.3° C., density: 0.961 g/cm$^3$.

The MFR of copolymer (A.1) was 10.3 g/10 min, determined at a load of 325 g at a temperature of 160° C.

The content of ethylene and methacrylic acid in copolymer (A.1) was determined by NMR spectroscopy or by titration (acid number). The acid number of the ethylene copolymer wax was determined titrimetrically according to DIN 53402. The KOH consumption corresponds to the methacrylic acid content in the copolymer (A.1)

The density was determined according to DIN 53479. The melting range was determined by DSC (differential scanning calorimetry, differential thermal analysis) according to DIN 51007.

2. Preparation of Formulations According to the Invention 206.8 g of copolymer (AA) were initially taken in a 2 liter autoclave having an anchor stirrer. 36.3 g of KOH were added, the volume was made up to one liter with distilled water and heating was effected to 98° C. with stirring. After stirring for 180 minutes at 98° C., cooling to room temperature was effected in the course of 15 minutes. A 21% by weight emulsion of copolymer (A.1), which was neutralized with KOH, was obtained.

In a stirred vessel, the amounts of emulsion of copolymer (A.1) and furthermore distilled water, nonionic or anionic surfactant (B), antifoam (C) and, if appropriate, diethanolamine (D.1) were mixed. The formulations F-1 to F-8 according to the invention were obtained.

TABLE 1

Preparation of formulations F-1 to F-8 according to the invention

| No. | Emulsion of copolymer (A.1), [g] | (B.1) [g] | (B.2) [g] | Antifoam (C.1) [g] | Diethanolamine (D.1) [g] | Water [g] |
|---|---|---|---|---|---|---|
| F-1 | 400 | — | 15 | 5 | — | 580 |
| F-2 | 400 | 10 | — | 5 | — | 585 |
| F-3 | 400 | 10 | 15 | 5 | — | 570 |
| F-4 | 400 | — | 15 | 5 | 10 | 575 |
| F-5 | 400 | 10 | — | 5 | 10 | 575 |
| F-6 | 200 | — | 15 | 5 | — | 780 |
| F-7 | 400 | 10 | — | 5 | 10 | 575 |
| F-8 | 400 | 20 | — | 5 | 10 | 565 |
| F-10 | 400 | 10 | — | 5 | 10 | 375 |
| F-11 | 400 | 10 | — | 5 | 10 | — |

Abbreviations:
(B.1): $C_{13}$-$C_{15}$-oxo alcohol, ethoxylated with 3 mol of ethylene oxide/mol of $C_{13}$-$C_{15}$-oxo alcohol
(B.2): 40% by weight solution of a 1:1 mixture (parts by weight) of $F(CF_2CF_2)_5$—$CH_2CH_2O$)—$P(O)(ONH_4)_2$ and $[F(CF_2CF_2)_5$—$CH_2CH_2O]_2P(O)(ONH_4)$ in water/isopropanol (parts by weight: 3:1), which solution was diluted in the ratio 99:1 with water.
(Note: 99 parts by weight of water, 1 part by weight of the 40% by weight solution of fluorosurfactant)
(C.1): triisobutyl phosphate Formulation F-10 according to the invention furthermore comprised 200 g of butyldiglycol (diethylene glycol mono-n-butyl ether).

Formulation F-11 according to the invention furthermore comprised 575 g of butyldiglycol.

For the preparation of comparative formulation C-F-9, 400 g of dispersion D1 from WO 2004/108601 were mixed with 10 g of (B.2), 5 g of antifoam (C.1) and 585 g of distilled water.

3. Coating According to the Invention of Surfaces and Comparative Experiment General Method:

A formulation F-1 to F-8 or F-10 or F-11 according to the invention was applied with the aid of a moist cloth to a polished stainless steel surface of stainless steel pieces (3 cm·15 cm·3 mm) and allowed to dry in the air. Stainless steel surfaces coated according to the invention were obtained. The thickness of the coating was on average from 3 to 15 μm.

Surfaces coated according to the invention were touched repeatedly with the fingers. Only after numerous repetitions were fingerprints observable, which, however, were not very conspicuous even when viewed against the light. The fingerprints could easily be removed by wiping in each case with a dry dust cloth or a paper tissue or a kitchen cloth, without application of pressure.

Comparative Experiment:

Comparative formulation C-F-9 was applied with the aid of a moist cloth to a polished stainless steel surface of a stainless steel piece (3 cm·15 cm·3 mm) and allowed to dry in the air. A coated comparative stainless steel surface was obtained. The thickness of the coating was on average from 3 to 15 μm.

The stainless steel surface coated with comparative formulation C-F-9 was repeatedly touched with the fingers. Even after a few repetitions, unaesthetic fingerprints were observable, which were very conspicuous to the observer and could not be wiped away with a dry cloth. However, the fingerprints could be removed with detergent solution.

4. Comparison of the Duration of Drying in the Coating, According to the Invention, of Surfaces A wipe ("kitchen roll extra absorbent" from Tork) was impregnated alternatively with formulation F-7, F-10 or F-11 according to the invention and wiped over a brushed stainless steel sheet ("sheet") at a temperature according to table 2. This was followed by drying. The drying time was determined.

The surfaces coated according to the invention were repeatedly touched with the fingers. Only after numerous repetitions were fingerprints observable, which, however, were not very conspicuous, even when viewed against the light. The fingerprints could easily be removed by wiping in each case with a dry dust cloth or a paper tissue or a kitchen cloth, without application of pressure.

TABLE 2

Coating of brushed stainless steel sheet

| Surface temperature of the sheet [° C.] | Drying time | | |
|---|---|---|---|
| | F-7 | F-10 | F-11 |
| 20° C. | 1 minute | 50 minutes | 100 minutes |
| 40° C. | 15 seconds | 8 minutes | 10 minutes |

We claim:
1. A method for coating surfaces which comprises coating a surface with a substantially paraffin-free aqueous formulation which comprises
(A) at least one copolymer having a melt flow rate (MFR) in the range from 1 to 50 g/10 min, which comprises, incorporated in the form of polymerized units,
(a) from 65 to 74.5% by weight of ethylene,

(b) from 25.5 to 35% by weight of at least one ethylenically unsaturated carboxylic acid,
and which is at least partly neutralized with alkali metal,
(B) an acidic phosphoric acid ester of fluorinated alcohols,
(C) at least one antifoam,
(D) optionally at least one organic amine, and
(E) optionally at least one organic solvent.

2. The method according to claim 1, wherein the surface comprises a metal.

3. The method according to claim 1, wherein the treatment is carried out as immersion or spraying or as treatment with textile.

4. The method according to claim 1, wherein said ethylenically unsaturated carboxylic acid (b) is (meth)acrylic acid.

5. The method according to claim 1, wherein said antifoam (C) is polyalkoxylated glycerol, polypropylene oxide or tri-$C_1$-$C_6$-alkyl phosphate.

6. A surface coated by the method according to claim 1.

7. A method for coating surfaces which comprises coating a surface with a substantially paraffin-free aqueous formulation which comprises
(A) at least one copolymer having a melt flow rate (MFR) in the range from 1 to 50 g/10 min, which comprises, incorporated in the form of polymerized units,
(a) from 65 to 74.5% by weight of ethylene,
(b) from 25.5 to 35% by weight of at least one ethylenically unsaturated carboxylic acid,
and which is at least partly neutralized with alkali metal,
(B) at least one nonionic or anionic surfactant an acidic phosphoric acid ester of fluorinated alcohols,
(C) triisobutyl phosphate as antifoam,
(D) optionally at least one organic amine, and
(E) optionally at least one organic solvent.

8. The method according to claim 7, wherein said nonionic surfactant (B) is a tri- to heptaalkoxylated oxo or fatty alcohol.

9. The method according to claim 7, wherein said anionic surfactant (B) is an acidic phosphoric acid ester of fluorinated alcohols.

10. A substantially paraffin-free aqueous formulation comprising
(A) at least one copolymer having a melt flow rate (MFR) in the range from 1 to 50 g/10 min, which comprises, incorporated in the form of polymerized units,
(a) from 65 to 74.5% by weight of ethylene,
(b) from 25.5 to 35% by weight of at least one ethylenically unsaturated carboxylic acid,
and which is at least partly neutralized with alkali metal,
(B) at least one nonionic or anionic surfactant,
(C) triisobutyl phosphate as antifoam,
(D) optionally at least one organic amine, and
(E) optionally at least one organic solvent.

11. The aqueous formulation according to claim 10, wherein said nonionic surfactant (B) is tri- to heptaalkoxylated oxo or fatty alcohol.

12. The aqueous formulation according to claim 10, wherein said anionic surfactant is a fluorinated surfactant.

13. The aqueous formulation according to claim 10, wherein said ethylenically unsaturated carboxylic acid (b) is (meth)acrylic acid.

14. A process for the preparation of the aqueous formulation according to claim 10, which comprises mixing
(A) at least one copolymer having a melt flow rate (MFR) in the range from 1 to 50 g/10 min, which comprises, incorporated in the form of polymerized units,
(a) from 65 to 74.5% by weight of ethylene,
(b) from 25.5 to 35% by weight of at least one ethylenically unsaturated carboxylic acid,
and which is at least partly neutralized with alkali metal,
(B) at least one nonionic or anionic surfactant,
(C) triisobutyl phosphate,
(D) optionally at least one organic amine, and
(E) optionally at least one organic solvent,
with one another in water.

\* \* \* \* \*